April 27, 1926. 1,582,384
J. H. CORBITT
LAND LEVELER AND ROAD MAINTAINER
Filed August 28, 1925 2 Sheets-Sheet 1
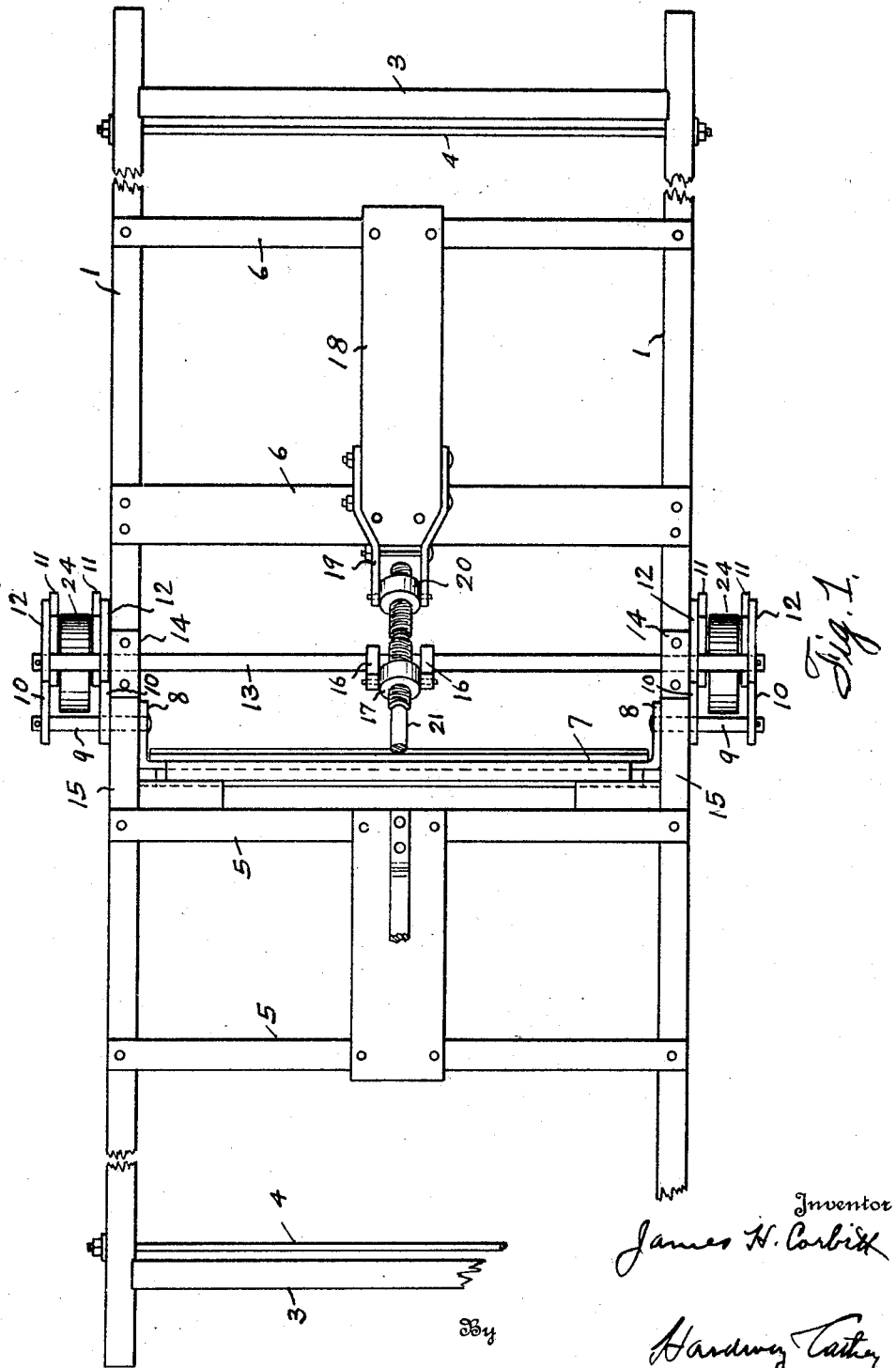

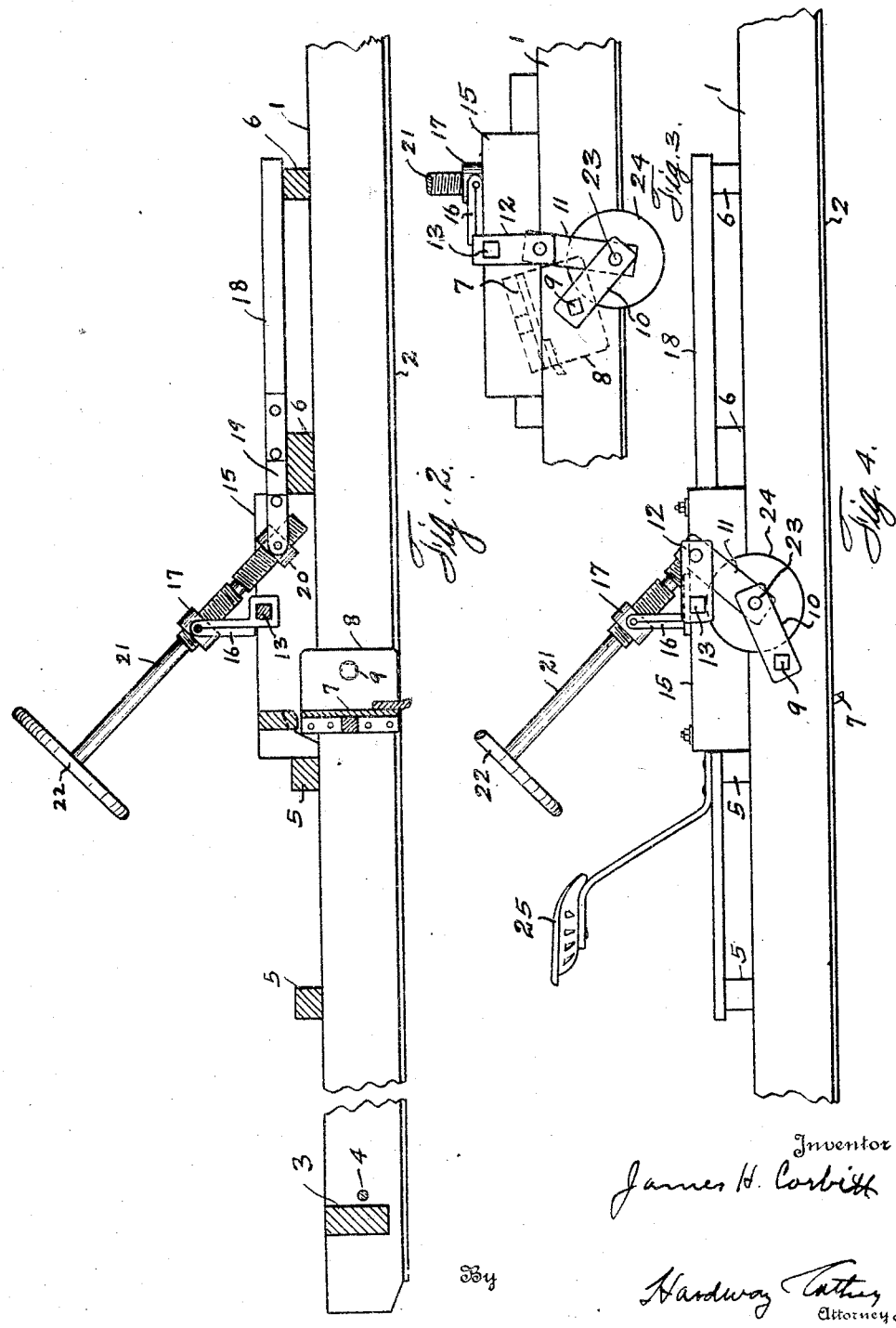

Patented Apr. 27, 1926.

UNITED STATES PATENT OFFICE.

1,582,384

JAMES H. CORBITT, OF HOUSTON, TEXAS.

LAND LEVELER AND ROAD MAINTAINER.

Application filed August 28, 1925. Serial No. 53,088.

*To all whom it may concern:*

Be it known that I, JAMES H. CORBITT, a citizen of the United States, residing at Houston, in the county of Harris and State of Texas, have invented certain new and useful Improvements in a Land Leveler and Road Maintainer, of which the following is a specification.

This invention relates to new and useful improvements in a land leveler and road maintainer.

One object of the invention is to provide an implement of the character described specially designed for the purpose of leveling land, and reducing the same to a comparatively smooth even surface; the implement is also useful in grading and smoothing dirt, gravel and shell roads.

Another object of the invention is to produce an implement of the character described equipped with ground wheels which may be withdrawn from contact with the ground while the implement is at work in leveling or smoothing the ground surface, but which may be lowered into contact with the ground, so as to support the implement in order that it may be more easily turned.

A further feature of the invention resides in the combination with runners, of a scraper, or leveling blade, ground wheels, and operative connections whereby the blade and ground wheels may be simultaneously operated to carry the blade into working relation with the ground surface and to carry the wheels out of contact with said surface and vice versa.

With the above and other features in view this invention has particular relation to certain novel features of construction, operation, and arrangement of parts, an example of which is given in this specification and illustrated in the accompanying drawings, wherein:—

Figure 1 shows a plan view of the implement.

Figure 2 shows a fragmentary longitudinal sectional view.

Figure 3 shows a fragmentary side elevation, showing the runners elevated by the ground wheels, and Figure 4 shows a sectional side elevation of the implement with the ground wheels elevated and the scraper blade in working position.

Referring now more particularly to the drawings, wherein like numerals of reference designate similar parts in each of the figures, the numerals 1, 1 designate the runners, which are preferably composed of comparatively heavy timbers, set edgewise, relative to the ground. The ends of the runners are upturned and the under edges are lined with metal soles 2, 2. The runners are fixed in proper relation by the front and rear transverse bars 3, 3 and the corresponding anchor rods 4, 4 as well as by the rear and front cross bars 5, 5 and 6, 6, nailed or bolted to the upper edges of the runners.

There is a transverse scraper blade 7 between the runners, approximately midway between their ends. The ends of this blade carry the overturned bearing plates 8, 8 which fit against the inner sides of the respective runners, and these plates have the respective stub shafts 9, 9 which work in bearings through the runners.

Fastened to these shafts are the pairs of arms 10, 10, whose free ends are pivoted to the adjacent ends of the respective links 11, 11, and the other ends of these links are pivoted to the free ends of the corresponding pairs of arms 12, 12, which are fixed to the respective ends of the transverse shaft 13. This shaft 13 is mounted to rotate in the bearings 14, 14 carried by the upper edges of the respective supports 15, 15, which are mounted on the runners 1, 1.

The shaft 13 has the spaced arms 16, 16, fixed thereon, and pivoted between the free ends of these arms there is a tapped block 17 having left hand threads. The cross bars 6 have an anchor 18 secured thereto whose rear end carries a bracket 19 in which there is the pivotally mounted tapped block 20 having right hand threads.

A hand wheel shaft 21 has left and right hand threads respectively, which are threaded through the respective blocks 17 and 20 and the upper end of this shaft carries the hand wheel 22.

The arms 10 and links 11 are pivoted together by means of the bearings rods 23, 23 and mounted on these rods are the ground wheels 24, 24, located slightly in front of the longitudinal center of the implement. A suitable seat 25 is provided for the operator behind the hand wheel 22.

The implement may be pulled by a team of draft animals or by a tractor.

When the shaft 21 is turned in one direction is will operate to carry the arms 16 forwardly into horizontal position, running the block 17 into vertical relation with the block 20 and said shaft will then assume a vertical position, as shown in Figure 3. This movement will operate to rotate the shaft 13 to bring the arms 12 and links 11 in substantially straight line relation, and will also swing the free ends of the arms 10 downwardly and rotate the stub shafts 9, 9 to carry the scraper out of contact with the ground. During this movement the ground wheels 24 will be carried into contact with the ground surface, and at the limit of this movement the front ends of the runners will be elevated clear of the ground so that the implement may be easily turned around.

A reverse rotation of the shaft 21 will elevate the ground wheels out of contact with the ground and will carry the blade 7 into working position. As the implement is then moved along, the elevated portions of the ground surface will be scraped off and the depressions filled and the surface thus leveled.

The reversely threaded blocks 17 and 20 and the correspondingly threaded shaft make it possible to manipulate the implement very expeditiously.

What I claim is:—

1. A land leveler including spaced runners, a transverse scraper blade mounted to rotate between the runners, ground wheels, and a common means operatively connected with said blade and wheels and operable to simultaneously rotate the blade and shift said wheels relative to the runners to bring said blade and wheels alternately into and out of contact with the ground surface.

2. A land leveler including spaced runners, a transverse scraper blade, eccentric end shafts carried by the blade and having bearings in the runners, a transverse shaft mounted on the runners, an arm fixed on one of said end shafts, an arm fixed on the transverse shaft, a link connecting said arms, a ground wheel carried by the first mentioned arm, and means for rotating said transverse shaft to control the position of said blade and ground wheel.

3. A land leveler including spaced runners, a transverse scraper blade having end shafts which work through bearings in the respective runners, arms fixed on the respective shafts, an actuating shaft, arms carried by said actuating shaft whose free ends are operatively connected with the corresponding arms of the blade shafts, means for rotating said actuating shaft and thereby controlling the position of said blade.

4. A land leveler including spaced runners, a transverse scraper blade having end shafts which work through bearings in the respective runners, arms fixed on the respective shafts, an actuating shaft, arms fixed on the respective ends of the actuating shaft, and connected with the corresponding arms of the blade shafts, means for rotating said actuating shaft and thereby controlling the position of said blade, said means including pivotally mounted tapped blocks, one carried by said actuating shaft and the other carried by said runners, and a hand operable shaft having threaded connections with said blocks.

5. A land leveler including spaced runners, a transverse scraper blade having end shafts which work through bearings in the respective runners, arms fixed on the respective shafts, an actuating shaft, arms carried by said actuating shaft whose free ends are operatively connected with the corresponding arms of the blade shafts, means for rotating said actuating shaft and thereby controlling the position of said blade, said means including a block having a pivotal connection with the actuating shaft, an anchor fixed with respect to the runners, a tapped block pivotally connected to said anchor, said blocks being reversely threaded and a hand operable shaft having threaded connections with said blocks.

6. A land leveler including spaced runners, a transverse scraper blade having end shafts which work through bearings in the respective runners, arms fixed on the respective shafts, an actuating shaft, arms carried by said actuating shaft whose free ends are operatively connected with the corresponding arms of the blade shafts, means for rotating said actuating shaft and thereby controlling the position of said blade and ground wheels mounted on said first mentioned arms.

In testimony whereof I have signed my name to this specification.

JAMES H. CORBITT.